United States Patent [19]

Meadow et al.

[11] 3,927,185

[45] Dec. 16, 1975

[54] PROCESS FOR PRODUCING CARBON DISULFIDE

[75] Inventors: Morton Meadow, Trenton; Sidney Berkowitz, Highland Park, both of N.J.

[73] Assignee: FMC Corporation, Philadelphia, Pa.

[22] Filed: Apr. 30, 1973

[21] Appl. No.: 355,991

[52] U.S. Cl. ............................................... 423/443
[51] Int. Cl.² ........................................ C01B 33/06
[58] Field of Search ...... 423/443, 563, 439; 23/278, 23/277 R, 278

[56] References Cited
UNITED STATES PATENTS

| | | | |
|---|---|---|---|
| 2,492,719 | 12/1949 | Thacker | 423/443 |
| 2,548,015 | 4/1951 | Goodson | 23/288 R |
| 2,775,512 | 12/1956 | Leithäuser | 23/288 R |
| 2,882,130 | 4/1959 | Porter | 423/443 |
| 3,436,181 | 4/1969 | Berthoux et al. | 423/443 |
| 3,699,215 | 10/1972 | Gerin et al. | 423/443 |

FOREIGN PATENTS OR APPLICATIONS

| | | | |
|---|---|---|---|
| 627,423 | 9/1961 | Canada | 423/443 |

*Primary Examiner*—Oscar R. Vertiz
*Assistant Examiner*—Michael L. Lewis

[57] ABSTRACT

Continuous process for producing carbon bisulfide by reaction of sulfur and hydrocarbon gas containing a multi-carbon hydrocarbon having at least three carbon atoms at a pressure in the range of 3.5 to 12 atmospheres. A stream of sulfur at a temperature of at least 650°C and a stream of the hydrocarbon gas are fed into a reaction zone continuously. The temperatures and rates of flow of said vapor and gas are such that the calculated mixing temperature thereof is in the range of about 585° to 700°C., and the flow conditions and mixing conditions of said gas and vapor streams are such that the hydrocarbon gas becomes substantially completely mixed with the sulfur vapor before the hydrocarbon comes into contact with a wall of the reaction zone.

26 Claims, 5 Drawing Figures

PROCESS FOR PRODUCING CARBON DISULFIDE

The reaction between hydrocarbons and sulfur to produce carbon disulfide is well known and is described for instance in Encyclopedia of Chemical Technology of Kirk-Othmer (second editon) Vol. 4 pages 376–380 (and references cited therein) and in numerous patents, such as U.S. Pat. Nos. 2,568,121; 2,636,810; 2,661,267; 2,708,154; 2,857,250; 2,882,130; 2,882,131; 3,087,788; these are only a few of the many patents on this subject.

To avoid the production of impurities, such as tars which can clog the reactor and contaminate the product or the recovered unreacted sulfur, it has been customary to employ methane of high purity and to minimize the content of higher hydrocarbons. It has heretofore been thought that non-catalytic mixing of sulfur vapor and hydrocarbon gas containing substantial proportions of higher hydrocarbons causes an undesirable thermal reaction to produce polymerization and condensation products. Thus at page 378 of the above-cited Encyclopedia of Chemical Technology there is described a process comprising "mixing the sulfur vapor and preheated methane streams and passing the mixture through a superheater before it enters the [catalytic] reaction", with the principal reaction taking place in the presence of a catalyst. In discussing this process, the Encyclopedia states:

"This procedure imposes a top limit on the amounts of other hydrocarbons, such as propane or heavier, in the methane feed. If present in large amounts, these higher molecular weight hydrocarbons, which are more reactive than methane under these conditions, will react thermally with the sulfur in the superheater to produce polymerization and condensation products . . ."

There have been teachings in the patent literature to the effect that certain of the higher hydrocarbons can be reacted non-catalytically with sulfur vapor. One of these, British Pat. No. 939,209 describes a process using a hydrocarbon feed containing at least 5 carbon atoms in the molecule, using a reaction temperature of at least 750°C, such as 900°C or 1000°C, at atmospheric pressure. The use of such high reaction temperatures requires special temperature-resistant materials of construction. Thus, ordinary stainless steels are known to have a short life at temperatures above say, 750°C in the presence of sulfur compounds. Furthermore operation at atmospheric pressure causes considerable difficulty in the recovery of the products of the reaction (as in the step of condensing the carbon disulfide from the reaction mixture) and increases the size of the reactor required. Another disclosure of a non-catalytic process, in U.S. Pat. No. 3,436,181, employs olefinic or diolefinic hydrocarbons and states that the results are "contrary to what could be expected from the results of the well-known reaction of sulphur on paraffinic hydrocarbons higher than $C_2$. . . "; see also U.S. Pat. No. 3,699,215. Another patent, British Pat. No. 1,173,344, employs a hydrocarbon feed in which propane constitutes at least 50% by weight and illustrates operation at atmospheric pressure.

We have discovered that the higher hydrocarbons, alone or in admixture, can be reacted with sulfur vapor under pressures greater than 3.5 atmospheres (i.e., greater than about 37 psig or greater than about 2700 or 3000 mm Hg absolute) to produce carbon bisulfide in high yields with very little undesirable by-products by continuously bringing together, in a reaction zone, a stream of sulfur vapor having a temperature of at least 650°C (and preferably below about 750°C) and a stream of gas comprising the higher hydrocarbon. The feed temperatures and rates of flow of the sulfur vapor and hydrocarbon gas must also be such that the calculated mixing temperature is in the range of about 585° to 700°C, more preferably about 625° to 675°C, and the flow conditions and mixing conditions of the sulfur stream and hydrocarbon stream must be such that the hydrocarbon stream becomes substantially completely mixed with sulfur vapor before the hydrocarbon comes into contact with a solid surface in the reaction zone, such as a heated wall thereof, so that a non-catalytic reaction occurs between substantially all the higher hydrocarbon and sulfur prior to such contact.

We have discovered that under the conditions of our process the reaction between the higher hydrocarbon and the sulfur occurs almost instantaneously. Thereafter the mixture may be brought into contact with the walls of the reactor, or into contact with packing or other solid surfaces without adverse effect.

In the process a substantially undiluted higher hydrocarbon may be used as the feedstock. In that case extremely high turbulence is needed in order to provide the necessary rapid mixing of the components. We have found, for instance, that such turbulence results from feeding the hydrocarbon stream countercurrent to the sulfur stream so that the two streams collide head-on. As can be seen from the Examples below, by this technique we have converted higher hydrocarbons, such as liquified petroleum gas (propane-butane mixtures) and pentane, in high yields to carbon disulfide in a residence time of 0.6 second in the reactor; the actual reaction time probably was much less.

As the concentration of higher hydrocarbon in the stream thereof is decreased, a lower degree of agitation is required to bring substantially all its molecules into reactive contact with the sulfur molecules of the surrounding stream before said hydrocarbon molecules reach the wall of the reactor. For instance when the hydrocarbon stream is primarily methane (which does not itself have a substantial tendency to form by-product tars during its thermal reaction with sulfur) and the concentration of hydrocarbon having more than four carbons in the injected stream is below about 3 mol% very good results can be obtained, in a reaction tube, by aiming the hydrocarbon stream co-current into the middle of the sulfur vapor stream to form a hydrocarbon jet which travels within the tube (e.g. centrally, or axially) without coming into contact with the walls of the tube, while the turbulence of the streams helps to mix them and assure that the molecules of higher hydrocarbon react with the sulfur. When, however, the same hydrocarbon jet is aimed slightly to the side (see Example X), significant amounts of undesired polymerization or condensation products, such as tars, are formed. After the initial mixing period, during which substantially all the higher hydrocarbon is reacted out of contact with the walls, the mixture may be led through further lengths of hot tubes around bends and into contact with various surfaces such as packings; during this further travel, substantially all the methane may be reacted with the sulfur under non-catalytic or catalytic conditions.

The rapid initial mixing of the two streams may be promoted in various ways. Thus, the tube may have a converging portion at about the point of introduction of the hydrocarbon stream so that the sulfur vapor travels the path of a converging cone whose apex lies along the centerline of the hydrocarbon stream, the sulfur vapors being forced into the central stream, giving rapid mixing while the mixture is out of contact with the surrounding walls. Othe mixing techniques to accomplish this purpose will be apparent to those skilled in the art. Also, the hydrocarbon may be introduced as a plurality of streams (e.g. two, three or four co-current streams clustered about the axis of the tube) or as a central annular stream. It is also within the broader scope of the invention to effect the initial mixing by injecting one or more streams of the hydrocarbon into a large back-mixing reactor into which a stream of sulfur is also introduced continuously and from which a stream of the reaction mixture is withdrawn continuously, the walls of the back-mixing reactor being spaced a considerable distance from the hydrocarbon injection points and the contents of that reactor being continuously agitated, as by means of turbulence induced by the mode of introduction of the sulfur vapors; the back-mixing reactor may be of such volume in relation to the feed volumes and have such mixing therein that the reaction mixture is of substantially uniform composition within the reaction zone, the composition of the mixture into which the feed gases are continuously injected being substantially the same as the composition of the mixture being continuously withdrawn from the reaction zone.

As indicated above the reaction may be carried out in a tubular reaction chamber through which the hot sulfur vapor is fed and into which the hydrocarbon stream is introduced through an orifice (which may be the outlet end of a hydrocarbon introduction nozzle). In one preferred embodiment, to help keep the hydrocarbon from contact with the walls of the reactor before it has reacted with the sulfur, the reaction chamber has a diameter which is more than 5 (e.g. 6, 10, 15, or 20) times the diameter of the hydrocarbon-introduction orifice. Thus, in an arrangement in which the hydrocarbon is introduced co-current with the sulfur stream, the reaction chamber may be a straight pipe having the aforesaid relatively large diameter over a distance (measured axially) of more than 50 (e.g. 80, 100, 200 or more) times the diameter of the hydrocarbon-introduction orifice. Or, it may be a tube which flares outwardly downstream of the hydrocarbon-introduction orifice. As mentioned above, the higher hydrocarbon reacts very rapidly while any methane in the hydrocarbon feed reacts more slowly with the sulfur. Thus, when the feed contains methane, the reactor may have a downstream portion for conversion of unreacted methane to carbon disulfide including a heating section which may be of considerably lesser diameter than the reaction chamber; e.g., the initial reaction may be carried out in a large diameter heated tube in a furnace and the reaction mixture may then be led through smaller diameter heated tubes in the same furnace and then to a large diameter packed reactor to carry the methane-sulfur reaction further.

The rapid initial mixing may also be promoted by using a stream of sulfur which moves substantially vertically, as by using a tubular reactor whose walls are substantially vertical rather than horizontal, thereby minimizing the effects of stratification of the streams and consequent contact between unreacted hydrocarbon and the walls of the tube. The sulfur vapor is much denser than the hydrocarbon under the conditions of the reaction and this density difference is accentuated, under the high pressures preferably used in the practice of this invention; that is, increased pressure increases the average molecular weight of the sulfur (more $S_8$ and $S_6$ are formed at the expense of $S_2$). The use of a vertically moving sulfur stream in itself constitutes another aspect of this invention, and it is within the broader scope of the invention to employ the vertically moving sulfur stream to obtain improved results even under conditions of lower pressure (e.g., atmospheric pressure or a pressure of 2 atmospheres) or lower mixing temperature, or both. The sulfur stream may move downward or upward and the hydrocarbon stream may be introduced countercurrent or co-current in either case, or may even be introduced horizontally into an upwardly or downwardly moving sulfur stream.

The mixing temperature can be calculated from the heat contributed by each feed component, assuming adiabatic mixing (no additional heat supplied by, or lost from, the outside during mixing) and no chemical reaction (it may be termed the "adiabatic non-reaction mixing temperature"). At this mixing temperature the sum of the gains and losses in enthalpy by the various feed components in reaching that temperature is zero; thus, for a two-component mixture the heat gained by one component is equal to the heat lost by the other. The gain or loss in enthalpy can be readily determined on the basis of published thermodynamic data.

For instance, the enthalpy of propane (in BTU per pound mol) as a function of temperature ("T", in degrees Kelvin) may be expressed as follows: $-49,409.318 - 1.739T + 6.551 \times 10^{-2}T^2 - 2.254 \times 10^{-5}T^3$; this formula is based on thermodynamic data given by Kobe et al in a series of articles on the thermochemistry of petrochemicals in Petroleum Refiner January 1949 to July 1958. (It will be apparent that, since the first term, $-49,409.318$, is not affected by temperature and since the number of mols of propane before and after mixing is the same, this first term has no effect on the calculation). The effect, on the enthalpy, of the change in the partial pressure of propane owing to mixing is negligible and is disregarded since it has no significant effect on the calculation (the propane behaves essentially as a perfect gas under the conditions of operation).

The calculation of the enthalpy change for the sulfur requires additional steps, because sulfur exists in various molecular forms, such as $S_2$, $S_6$ and $S_8$ (while other sulfur species exist, disregarding them has no significant effect on the calculation). For $S_2$ the enthalpy (in BTU per pound mol) is $51,986.842 + 11.698T + 4.768 \times 10^{-3}T^2 - 2.338 \times 10^{-6}T^3$; and for $S_6$ it is $39,463.695 + 34.6T + 2.376 \times 10^{-3}T^2$; and for $S_8$ it is $35,065.98 + 45.00T + 3.168 \times 10^{-3}T^2$. See for instance K. K. Kelly, U.S. Bureau of Mines Bulletin 406.5 (1937). The distribution (relative proportions) of the various sulfur species depends on the pressure and temperature and can be calculated from known thermodynamic data, such as given by Kelly. Thus the distribution of S molecules in the incoming sulfur stream (whose temperature and pressure is known) can be determined by a trial and error method (as by repeated iterations on a computer). That is, a distribution is assumed and its correctness is checked mathematically by the use of known kinetic constants (given by Kelly) relating to the conversion of one form of sulfur into another; based on those calculations, another assumed distribution is chosen and the process of calculation and choice is continued until the correct value is obtained.

The mixing temperature can be calculated by a double set of trial-and-error computations. That is, a mixing temperature is assumed and, from the known number of mols of substances other than sulfur in the feed (e.g. propane) and the known weight of sulfur in the feed, one can calculate (by trial-and-error as described above) the distribution of the various sulfur species in the mixture at that assumed mixing temperature. From this, the changes in enthalpies at the assumed mixing temperature are calculated; based on that calculation a new assumed mixing temperature is chosen, a new sulfur distribution is calculated (again by trial-and-error, as above) and the changes in enthalpies at that new assumed mixing temperature are calculated; and the process of calculation and choice is repeated (as by repeated iterations on a computer) until a temperature is found at which the sum of the enthalpy changes for the feed components is zero.

While the formulas for enthalpies are given above in terms of BTU per pound mol, the very same formulas may be employed for metric units. That is, in the calculation the units in which the formulas are expressed (whether BTU per pound mol or calories per gram mol) become immaterial.

It is found that the calculated mixing temperature is affected significantly by the pressure; thus, if propane is preheated to 200°C and supplied at the rate of 153.3 pounds per hour and sulfur is preheated to 600°C and supplied at the rate of 1823 pounds per hour (stoichiometrically, a 63% excess of sulfur), at atmospheric pressure the calculated mixing temperature is about 574°C, at 2 atmospheres pressure it is about 563°C, and at 4 atmospheres it is about 549°C. The pressure in the reactor is preferably within the range of 3.5 to 12 atmospheres, more preferably about 5 to 10 atmospheres.

The reactor walls may be of any suitable corrosion-resistant construction material such as steel containing significant proportions of chromium and/or nickel. Such commonly available materials as stainless steels, such as those containing about 20% nickel, about 25% chromium and about 0.2 to 0.4% carbon, may be employed. The temperature of the reactor walls is preferably below about 750°C, and above 550°C or 600°C, such as about 650° to 700°C.

As indicated previously the reaction of sulfur with the higher hydrocarbons takes place very quickly in the process of this invention. The reaction mixture may then be quenched and treated to recover sulfur and carbon bisulfide in conventional manner. The reaction mixture may be also maintained at a relatively high temperature (e.g. in the range of about 550° to 700°C, such as about 600° to about 650°C) for relatively long periods before quenching; this is particularly useful for mixtures containing substantial proportions of the more slowly reacting methane, in order to cause the methane to be converted substantially completely to carbon bisulfide, and for this purpose additional reaction zones (such as described by Porter U.S. Pat. No. 3,087,788) may be used).

The counter-current mixing in itself constitutes another aspect of this invention and it is within the broader scope of the invention to employ the counter-current mixing procedure to obtain improved results even under conditions of lower pressure (e.g. atmospheric pressure or a pressure of 2 atmospheres) or lower mixing temperature, or both.

As will be seen from the following Examples, the proportion and type of the multi-carbon hydrocarbon may vary widely. It may constitute 100% of the hydrocarbon feed stream or a much smaller fraction. For instance the hydrocarbon feed stream may be methane containing as little as about 0.3 mol % of hydrocarbons having three or more carbon atoms or as little as 0.04 mol % of hydrocarbons having four or more carbon atoms, or it may be methane containing over 1% of hydrocarbons having four or more carbon atoms. The higher hydrocarbons may be saturated aliphatic hydrocarbons, but (as indicated below) they may be cycloaliphatic or even aromatic, and olefinic compounds may also be present. Generally the average number of carbons of the multi-carbon hydrocarbons will be less than 8 and the content of hydrocarbons having 9 carbons atoms or higher will be well below 10 mol %.

For best results the sulfur is fed to the reactor at a rate in excess of that stoichiometrically needed for the formation of $CS_2$ by reaction with the particular hydrocarbon feedstock. This excess if preferably well above 1%, more preferably at least 10%. With higher concentrations of the higher hydrocarbons in the feedstock, it is preferable to use greater excesses of sulfur, such as excesses of about 20–300% more preferably about 30–200%.

As indicated in the Examples, the hydrocarbon stream may be fed into admixture with the sulfur stream through a single circular opening or orifice. It is also within the broader scope of the invention to feed it through orifices of other shapes, such as rectangular or annular, as well as through a plurality of orifices which may all be located at the same stage of the sulfur flow or (but not necessarily) located at different stages thereof, i.e., a second orifice being situated downstream of the first one. The hydrocarbon feed is preferably at a temperature below that at which significant thermal cracking occurs for its hydrocarbons of at least three carbon atoms (we believe, however, that such cracking occurs when the hydrocarbons come into contact with the hot sulfur vapors, with the sulfur acting as a cracking initiator in process). Thus the temperature of the hydrocarbon feed is preferably below about 500°C, such as below about 450°C, e.g. about 425°, 400° or much lower, such as room temperature. It is however within the broader scope of the invention, although less desirable, to preheat the hydrocarbon to a temperature at which cracking does occur.

The following Examples are given to illustrate this invention further. In the Examples the volumes given represent, in accordance with standard practice, the volume calculated to standard conditions (STP) of a temperature of 0°C and an absolute pressure of 760 mm Hg. Residence times are given in seconds and are equal to 3600 divided by "space velocity" (S.V.) expressed in hours$^{-1}$; S.V. is the quotient of the total volume (in liters) of reactants at STP (with sulfur calculated as $S_2$) per hour, divided by the reactor volume (in liters).

The accompanying drawings illustrate, in cross-section, various reactor arrangements described in some of the following Examples, as follows: FIG. 1, Example I; FIG. 2, Example VII; FIG. 3, Example VIII; FIG. 4, Example X, FIG. 5, Example IX.

EXAMPLE I

In this Example a narrow stream of propane heated to 425°C is injected countercurrent concentrically into a much wider stream of sulfur preheated to 700°C. to react substantially adiabatically at a pressure of about 40 psig. The flow rates are so controlled that the amount of sulfur is about 34% in excess of that required for the stoichiometric reaction with the propane to form carbon bisulfide. The reaction is effected in a short reactor, the residence time therein being 0.61 second, and the reaction mixture is them immediately quenched, first in a vessel at 140°C (thereby condensing the sulfur in the reaction mixture). The non-condensed gases, including carbon bisulfide, then pass through a pressure-regulator (set to provide a back pressure of 3.7 atmospheres, i.e., 40 psig) from which the gases are passed to a condenser at 0°C and under pressure to condense carbon bisulfide; non-condensed gases are vented at atmospheric pressure. The propane is injected through a 0.318 cm diameter circular orifice into the stream of sulfur flowing in a circular pipe having an internal diameter of a 2.09 cm.

The calculated mixing temperature is about 675°C.

The propane is converted substantially quantitatively (over 99%) and analysis of the condensed carbon bisulfide indicates that it has a purity of 99.89%, about 0.02% of benzene, about 0.09% of thiophene and no toluene. The condensed sulfur contains only traces of carbonaceous material.

More specifically, the reactor is a vertical 45.6 cm long section of stainless steel pipe, specifically Schedule 40, ¾ inch IPS pipe, into which a hydrocarbon-introduction tube having an outside diameter of 0.635 cm projects from the side. The end·of that tube is closed and the upstream side of the tube, adjacent the closed end, is machined to form a smooth flat upstream face arranged perpendicular to the flow path of the sulfur through the larger pipe; into that face the 0.318 cm diameter orifice is drilled. There is a bend in the pipe (through which the hot sulfur vapor is supplied) upstream of the vertical reaction section (in which the hydrocarbon-introduction tube is situated); the bend is about 30 cm upstream of the hydrocarbon-introduction orifice. The reactor is situated in a furnace, whose temperature is about 700°C. The sulfur and propane are fed to the reactor (from storage vessels maintained at pressures of about 100 psig, through suitable pre-heaters and flow control devices) at rates of 760 g per hour of sulfur and 39.8 liters (at STP) per hour of propane. (The terms "upstream" and "downstream" are used with reference to the direction of flow of the sulfur and of the resulting reaction mixture which is downward in the Example).

EXAMPLE II

Example I is repeated, using a mixture of propane and H₂S in a 1:2 volumetric ratio in place of the pure propane; in this case the sulfur excess with respect to stoichiometry is 300%.

The calculated mixing temperature is about 690°C.

Here again there is a substantially quantitative conversion of propane. Analysis of the condensed carbon bisulfide indicates that it is over 99.99% pure, contains about 0.0055% benzene, 0.0002% thiophene and no toluene. The condensed sulfur is bright yellow with no trace of tars.

Specifically the feed rates are 760 g per hour of sulfur, 13.3 liters (at STP) per hour of propane and 26.6 liters (at STP) per hour of H₂S.

EXAMPLE III

Example I is repeated, using a mixture of n-hexane and H₂S in a 1:3 volumetric ratio in place of pure propane (in this case the sulfur excess with respect to stoichiometry is 100%), a residence time of 0.58 second, a sulfur preheat temperature of 650°C a preheat temperature of the hexane-H₂S feed to 200°C.

The calculated mixing temperature is about 620°C.

Conversion of hydrocarbon to carbon bisulfide is 97 percent. Subsequent inspection of the reactor shows no evidence of carbonaceous impurities. Analysis of the condensed carbon bisulfide indicates that it contains some 3.66% of benzene, 0.35% of thiophene and 0.002% of toluene. The condensed sulfur appears clear and bright.

The subsequent inspection of the reactor also shows a considerable accumulation of scale (owing to the effects of a large number of previous runs at various conditions). It is believed that the level of impurities in the carbon bisulfide is largely due to the surface effect because of this scale accumulation. It is preferable to operate with a smooth surfaced reactor. However, even with this scaly reactor the walls are free of carbon deposits after the run.

EXAMPLE IV

Example I is repeated, using an LPG mixture (made up largely of butanes and propane, as described below) in place of the pure propane, with a sulfur excess of 150% with respect to stoichiometry, a residence time of 0.58 second, a sulfur preheat temperature of 700°C and a hydrocarbon preheat temperature of 200°C.

The calculated mixing temperature is about 685°C.

Conversion of hydrocarbon to carbon bisulfide is 99.8%. Analysis of the condensed carbon bisulfide indicates that it contains 0.0834% benzene, 0.0425% thiophene, 0.0003% toluene and no higher molecular weight constituents. The condensed sulfur appears clear and bright.

The LPG mixture (Phillips LPG Mixture No. 31) has the following composition (in which all numbers are mol percents): ethane 0.01, propane 36.94, isobutane 16.11, n-butane 44.83, n-pentane 0.01, isopentane 2.04, trans-butene-2 0.02, cis-butene-2 0.01, isopropylfluoride 0.03.

EXAMPLE V

Example I is repeated, using n-butane in place of the pure propane, with a sulfur excess of 100% with respect to stoichiometry, a residence time of 0.58 second, a sulfur preheat temperature of 700°C. and a hydrocarbon preheat temperature of 200°C.

The calculated mixing temperature is about 675°C.

Conversion of hydrocarbon to carbon bisulfide is 99.8 percent. Analysis of the condensed carbon bisulfide indicates that it contains 0.0246% benzene, 0.1% thiophene, 0.002% toluene and 0.002% higher molecular weight constituents. The condensed sulfur appears clear and bright.

EXAMPLE VI

Example I is repeated, using n-pentane (practical grade) in place of the pure propane, with a sulfur excess of 50% with respect to stoichiometry, a residence time of 0.58 second, a sulfur preheat temperature of about 630°–650°, hydrocarbon preheat temperature of 200°C., an orifice of 0.16 cm diameter, and a pressure of 4.4 atmospheres (60 psig) in the reactor.

The calculated mixing temperature is about 605°C.

Conversion of hydrocarbon to carbon bisulfide is 99 percent. Analysis of the condensed carbon bisulfide indicates that it contains 0.35% benzene, 0.68% thiophene, 0.0008% toluene and 0.0011% higher molecular weight constituents. The condensed sulfur appears clear and bright.

EXAMPLE VII

Example I is repeated, using an aliphatic petroleum naphtha (containing heptane, methylcyclohexane and toluene as principal constituents) in place of the pure propane, with a sulfur excess of 100% with respect to stoichiometry, a residence time of 1.35 seconds, a sulfur preheat temperature of 650°C and a hydrocarbon preheat temperature of 200°C. In this case, however, the hydrocarbon-introduction tube is positioned with its flat face (an orifice) facing downstream, so that the flow of hydrocarbon is co-current with the sulfur.

The calculated mixing temperature is about 620°C.

Conversion of hydrocarbon to carbon bisulfide is 94 percent. Analysis of the condensed carbon bisulfide indicates that it contains 5.44% benzene, 0.19% thiophene, no toluene and 0.0002% higher molecular weight constituents. The condensed sulfur appears clear and bright.

The approximate composition of the naphtha in mol percent is : 2-methylhexane 0.3; 2,3-dimethylpentane plus 1,1-dimethylcyclopentane 0.2; trans-1,3-dimethylcyclopentane 1.0; cis-1,3-dimethylcyclopentane 0.6; trans-1,2-dimethylcyclopentane 0.5; isooctane 1.5; n-heptane 25.0; cis-1,2-dimethylcyclopentane 1.9; methylcyclohexane 44.3; ethyl-cyclopentane 0.2; 2,5-dimethylhexane 2.3; 3,3-dimethylpentane 1.2; toluene 10.2; 2,3,4-trimethylpentane 2.9; 1,1,2-trimethylcyclopentane 0.7; others 7.2.

EXAMPLE VIII

Example I is repeated, except for the following: the reactor is made up of four 61 cm long parallel sections (of the same ¾ inch IPS, Schedule 40, stainless steep pipe) each of which is joined to its neighbor by a return elbow of the same stainless steel so that the reaction mixture flows successively through the four sections in a sinuous path. The preheated sulfur passes directly into this reactor, while the hydrocarbon is introduced co-current concentrically into the stream of sulfur (at a point 2.5 cm downstream of the inlet of the reactor) through the open end of a feed tube having an internal diameter of 0.683 cm. The reactor is kept in an electric furnace and the temperature measured at the internal wall of the reactor at a point 16 cm downstream of the reactor inlet is 650°C. The hydrocarbon is a natural gas of the following molar composition: 89.78% methane, 4.18% ethane, 1.7% propane, 2.2% butanes, 2.04% nitrogen and 0.1% water. The sulfur is preheated to 650°C and the hydrocarbon to 400°C. The sulfur excess is 15% with respect to stoichiometry, the residence time is about 15 seconds and the reactor pressure is 80 psig.

The calculated mixing temperature is about 590°C.

Conversion to carbon bisulfide is near quantitative. Analysis of the condensed carbon bisulfide indicates that it has a purity of 99.99 + %, containing only 0.0045-0.0075% benzene and thiophene as trace impurities.

After operating continuously for more than 110 hours, there is no plugging of the tubes of the reactor and no carbon or tar formation. The condensed sulfur is clear, bright yellow and free of tars.

In this Example the rates of supply of sulfur and hydrocarbon are 357 g per hour and 50 liters (at STP) per hour, respectively.

The next two examples illustrate the wall effect on tube fouling and by product formation.

EXAMPLE IX

The reactor of Example VIII is utilized with the same natural gas, but introducing that gas through a specially designed venturi to obtain instant mixing of the hydrocarbon and sulfur, with a sulfur preheat temperature of 700°C, a hydrocarbon preheat temperature of 400°C, a sulfur excess of 5%, a measured reactor temperature of 700°C, a residence time of 11 seconds, and a pressure of about 6.5 atmospheres (80 psig).

The calculated mixing temperature is about 640°C.

The conversion rate of the natural gas is quantitative and the carbon bisulfide has a purity of 99.99 + % with less than 0.0012% benzene and thiophene as trace impurities. There is no evidence of tar formation in the recovered sulfur.

In this Example the rates of supply of sulfur and hydrocarbon are 578 g per hour and 88.3 liters (at STP) per hour respectively.

EXAMPLE X

The reactor of Example VIII is utilized with the same natural gas, with a sulfur preheat temperature of 700°C, a hydrocarbon preheat temperature of 400°C, a sulfur excess of 5%, a measure reactor temperature of 700°C, a residence time of 11 seconds, and a pressure of 6.5 atmospheres (80 psig). Unlike Example VIII, in this Example the central hydrocarbon inlet tube is tilted noticeably (at an angle greater than 10° to the axis of the reactor pipe) so that the hydrocarbon is directed initially somewhat toward the wall of the reactor pipe. In contrast to Example IX (using similar conditions of temperature, pressure, flow rates, residence time, etc.) the conversion rate of the natural gas is only 97%, the carbon bisulfide contains in excess of 0.1% of thiophene and benzene, and there is substantial evidence of tars and fouling in the reactor tubes and in the recovered sulfur.

EXAMPLE XI (A) The reactor of Example VIII is utilized with the same natural gas, a sulfur preheat temperature of 600°C, a hydrocarbon preheat temperature of 400°C, 30% excess sulfur with respect to stiochiometry, residence time of 11 seconds, measured reactor temperature of 650°C, reactor pressure 80 psig (about 6.5 atmospheres).

The rates of supply of sulfur and hydrocarbon are 611 g per hour and 75.5 liters (STP) per hour, respectively.

The calculated mixing temperature is 560°C.

The conversion of hydrocarbon is 92.3%, the condensed carbon bisulfide contains 0.0122% thiophene and benzene, and there is evidence of fouling of the reactor.

(B) The Example is repeated, except that the sulfur preheat temperature is 650°C. This gives a calculated mixing temperature of 605°C. The conversion of hydrocarbon is quantitative, the condensed carbon bisulfide is 99.99% pure, with 0.0036% thiophene and benzene and there is no evidence of tarring or fouling of the reactor.

EXAMPLE XII

Example I is repeated, using a mixture of 1 mol of propane and 3 mols of propylene in place of the pure propane, with a sulfur excess of 112% with respect to stiochiometry, a residence time of 0.61 second, a sulfur preheat temperature of 700°C and a hydrocarbon preheat temperature of 415°C and a hydrocarbon-introduction orifice having a diameter of 0.102 cm.

The calculated mixing temperature is about 680°C.

Conversion of hydrocarbon is over 99%. Analysis of condensed carbon bisulfide indicates that it contains 0.0466% benzene, 0.0118% thiophene, no toluene.

EXAMPLE XIII

Example I is repeated, using methane in place of the pure propane, with a sulfur excess of 150% with respect to stoichiometry, a residence time of 0.59 second, a sulfur preheat temperature of 700°C and a hydrocarbon preheat temperature of 415°C.

The calculated mixing temperature is about 680°C.

Conversion of hydrocarbon is about 91%. Analysis of the condensed carbon bisulfide indicates that it contains 0.003% benzene, 0.004% thiophene, no toluene.

EXAMPLE XIV

In this Example apparatus similar to that described in Example VIII is used; sulfur is introduced continuously into a pipe in a furnace and, at a point on the pipe at which the sulfur has become vaporized and preheated the desired predetermined temperature, the preheated hydrocarbon is introduced continuously through a concentrically located tube to react with the sulfur in the heated pipe. The internal diameter of the pipe is 14.288cm and the internal diameter of the hydrocarbon feed tube is 3.18 cm (its external diameter is 4,288 cm). The hydrocarbon feed is natural gas having the following analysis (by mol %): methane 96,73, ethane 2.28, propane 0.32, isobutane 0.02, butane 0.01, isopentane 0.01, n-pentane 0.01, hexane less than 0.01, other hydrocarbons 0.01, nitrogen 0.23, $CO_2$ 0.37. The inlet pressure is about 7.8 atmospheres (about 100 psig), the sulfur is preheated to 650°C, the hydrocarbon feed is preheated to 400°C., the excess sulfur with respect to stiochiometry is 15%. The sulfur and hydrocarbon enter the reaction zone at linear velocities of 6.48 and 116 meters per second, respectively (calculated on the basis of their feed rates and cross-sectional areas; for sulfur the area is that of the annular space around the hydrocarbon feed tube). The calculated mixing temperature is on the order of 600°C. The mixture travels through a straight length of the same pipe for about 9.1 meters, then around a bend and through more of the same type of pipe in the furnace, then (its temperature being about 630°–650°C) enters a packed reactor chamber, then passes through more heated pipe in the furnace to reheat it to about 630°–650°C and then through a second packed reactor chamber containing silica gel particles, the total residence time of the mixture being about 34 seconds, after which sulfur and carbon bisulfide are successively condensed from the mixture in conventional manner. Carbon bisulfide is produced in very high yield and at very high purity, having especially low benzene content.

EXAMPLE XV

Repeat Example XIV using a hydrocarbon feed tube whose outlet has an internal diameter of 1.4 cm, all other conditions being the same (except for the hydrocarbon linear velocity which is of course higher, since the same amount of hydrocarbon is fed through a smaller opening).

EXAMPLE XVI

Repeat Example XIV using a reactor whose 9.1 meter length (upstream of the first bend encountered by the mixture) has a diameter of 20 cm, all other conditions being the same (except for the sulfur linear velocity which is of course lower, since the same amount of sulfur is fed through a larger pipe).

In Examples III, IV, V VI, VII, XII, and XIII the sulfur feed rates in grams per hour are 760, 850, 832, 855, 760, 840 and 760, respectively, and the hydrocarbon feed rates (in grams per hour unless indicated otherwise) are 53.4 hexane, 47.2 LPG, 58 butane, 80.2 pentane, 53.8 naphtha, 7.5 liters (STP) propane and 22.4 liters (STP) propylene per hour, 54 liters (STP) methane per hour. In these Examples, simple calculation shows that the linear velocity of the hydrocarbon stream emerging from the orifice is considerably greater than the linear velocity of the sulfur stream; thus for Example VI the pentane linear velocity is well over twice the sulfur linear velocity, specifically about 30.9 cm per second vs about 6.7 cm per second.

Figure 1:
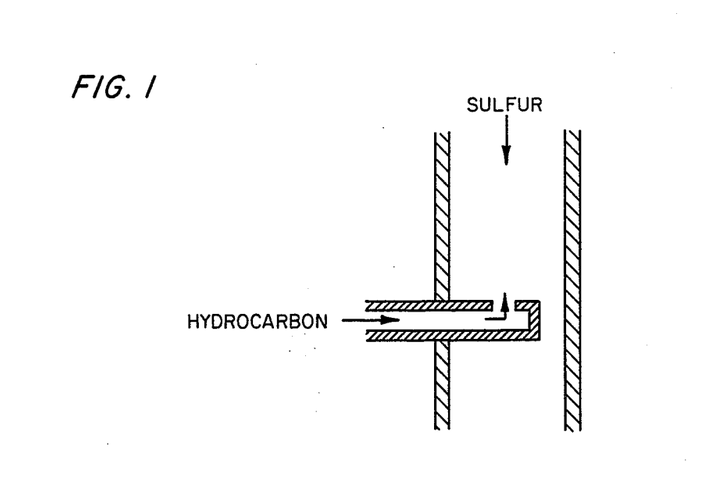
Figure 2:
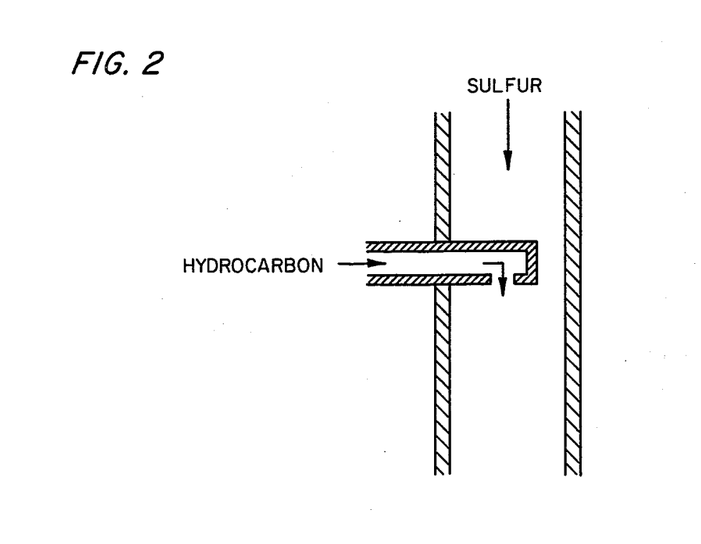
Figure 3:
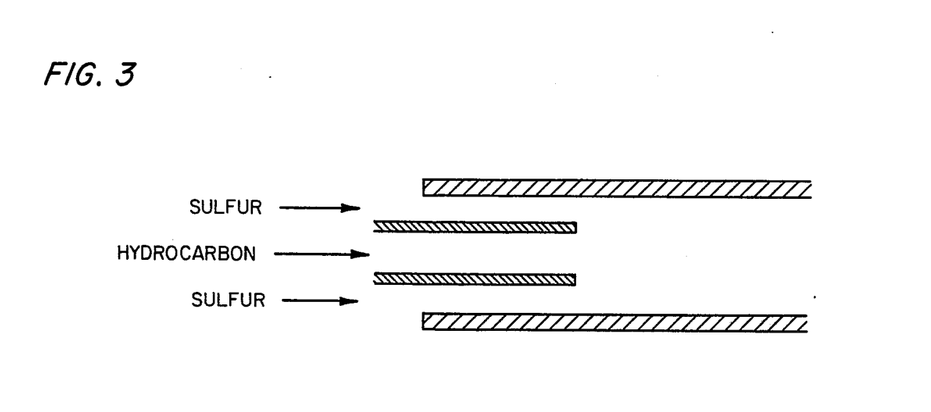
Figure 4:
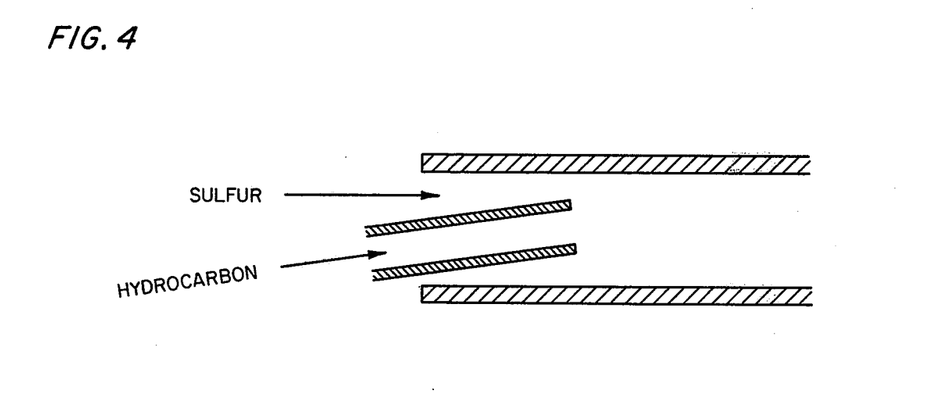
Figure 5:
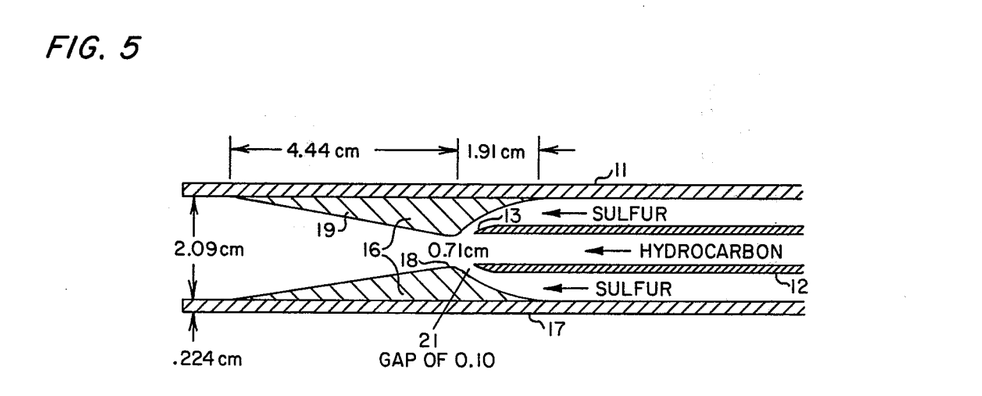

Reference is made here to the copending application Ser. No. 355,992 of Meadow, Berkowitz and Manganaro entitled "Sulfur-Hydrocarbon Reactions" filed on the same day as the present application, whose entire disclosure is incorporated by reference. That application discloses the use of converging sulfur stream. The venturi mentioned in Example IX above is that shown in FIG. 5, which is a duplicate of FIG. 1 of said copending application, in which the sulfur vapor is introduced through the pile 11 of circular cross section, in an annular stream around the coaxial hydrocarbon feed tube 12 (also of circular cross section) having a chamfered outlet end 13. To form the sulfur vapor stream into a converging conical stream, there is a venturi insert 16 which fits securely within the otherwise uniform pipe 11 and which has an inwardly converging portion 17, a throat 18 and an outwardly converging (or pressure recovery) section 19. The sulfur vapor stream is thus forced through a narrow gap 21 around the chamfered outlet end of the hydrocarbon feed tube, thus greatly increasing in velocity (Bernoulli's principle) as it approaches the hydrocarbon stream. This increase in velocity increases the "force ratio" of the outer (sulfur) stream to the inner (hydrocarbon) stream forcing the sulfur stream into penetrating contact with the hydrocarbon stream) and increases the interpenetration and mixing of the two streams. The force ratio is defined as $M_o M_i / M_i V_i$ where $M_o$ and $M_i$ are the mass rates of flow of the outer and inner streams respectively and $V_o$ and $V_i$ are the respective linear velocities of said streams. The force ratio in Example IX is in the neighborhood of 10.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. Continuous process for producing carbon bisulfide by reaction of sulfur and hydrocarbon gas containing a multi-carbon hydrocarbon having at least 3 carbon atoms which comprises continuously feeding, into a reaction zone having solid walls, a stream of sulfur vapor having a temperature of at least 650°C and a stream of said gas, to mix therewith in said zone, the temperatures and rates of flow of said vapor and gas being such that the calculated mixing temperature thereof is in the range of about 585° to 700°C., and the flow conditions and mixing conditions of said gas and vapor streams being such that said gas becomes substantially completely mixed with said vapor before said gas comes into contact with a wall of said zone, and thereby effecting non-catalytic reaction between substantially all said multi-carbon hydrocarbon and sulfur prior to such contact, said reaction being effected at a pressure of at least 3.5 atmospheres.

2. Process as in claim 1 in which said hydrocarbon gas contains at least 0.04 mol% of multi-carbon hydrocarbon having at least three carbon atoms.

3. Process as in claim 2 in which said hydrocarbon gas contains at least 0.3 mol % of hydrocarbon having at least three carbon atoms and at least 0.04 mol % of hydrocarbon having at least four carbon atoms.

4. Process as in claim 1 in which said mixing temperature is about 625° to 675°C. and said pressure is up to about 12 atmospheres.

5. Process as in claim 1 in which the hydrocarbon content of said hydrocarbon stream is principally multi-carbon hydrocarbon having at least 3 carbon atoms.

6. Process as in claim 5 in which said reaction zone is a tube and said hydrocarbon gas stream is introduced into said tube in a direction countercurrent to the direction of said sulfur vapor stream.

7. Process as in claim 1 in which the hydrocarbon content of said stream is principally methane.

8. Process as in claim 7 in which said reaction zone is a tube and said hydrocarbon gas stream is introduced into said tube in a direction co-current to the direction of said sulfur vapor stream.

9. Process as in claim 7 in which the sulfur and methane in said reaction mixture are further reacted at a temperature in the range of about 550° to 700°C and the mixture is then cooled to condense sulfur and carbon disulfide successively therefrom.

10. Process as in claim 1 in which the temperature of said hydrocarbon gas is below its cracking temperature.

11. Process as in claim 1 in which the temperature of said hydrocarbon gas is below about 450°C.

12. Process for producing carbon bisulfide by the reaction of sulfur and a hydrocarbon in gaseous state, wherein the improvement comprises feeding to a reaction zone a stream of sulfur vapor and a stream of said gaseous hydrocarbon countercurrent to impinge said streams on each other in said reaction zone at a temperature at which the reaction of said sulfur and said hydrocarbon to form carbon bisulfide occurs, the temperatures and rates of flow of said sulfur and said hydrocarbon being such that the calculated mixing temperature thereof is in the range of about 585° to 700°C.

13. Process as in claim 12 in which said reaction zone is at a pressure of at least 3.5 atmospheres.

14. Process as in claim 13 in which said hydrocarbon stream is directed substantially head-on at said sulfur vapor stream.

15. Process as in claim 14 in which said sulfur vapor stream is passed downstream through a tube within which a stream of said hydrocarbon is directed substantially axially of said tube and the resulting mixture passes through said tube downstream of the point at which said hydrocarbon stream comes into contact with the sulfur.

16. Process as in claim 13 in which said hydrocarbon gas contains at least 0.3 mol % of hydrocarbon having at least three carbon atoms and at least 0.04 mol % of hydrocarbon having at least four carbon atoms. atoms.

17. Process as in claim 15 in which the hydrocarbon content of said hydrocarbon stream is principally at least one multicarbon hydrocarbon having at least 3 carbon atoms.

18. Process as in claim 1 in which the reaction zone comprises a tubular reaction chamber through which the stream of hot sulfur vapor is fed and into which the stream of hydrocarbon gas is introduced through an orifice, said tubular chamber having a diameter which is more than 5 times the diameter of said orifice.

19. Process as in claim 1 in which the diameter of said tubular reaction chamber at a point spaced (in the direction in which said hydrocarbon stream is discharged) from said orifice by a distance of 50 times the diameter of said orifice is more than 5 times the diameter of said orifice.

20. Process as in claim 1 in which said hydrocarbon stream is introduced into a vertically moving stream of sulfur vapor.

21. Process for producing carbon bisulfide by the reaction of sulfur and a hydrocarbon in gaseous state in which a hydrocarbon stream is introduced into a stream of sulfur in a reactor to form a hot reaction mixture whereby to react said sulfur and hydrocarbon to form carbon bisulfide in said reactor, said reactor having solid walls, wherein the improvement comprises moving said reaction mixture vertically from the zone of introduction of said hydrocarbon stream, the temperatures and rates of flow of said sulfur and said hydrocarbon being such that the calculated mixing temperature thereof is in the range of about 585° to 700°C.

22. Process as in claim 21 in which said reactor comprises a duct having substantially vertical walls and through which a stream of sulfur vapor moves substantially vertically, the stream of hydrocarbon being introduced into the sulfur vapor at a point spaced from said walls.

23. Process as in claim 5 in which said hydrocarbon content is principally saturated multicarbon hydrocarbon having at least 3 carbon atoms and the average number of carbon atoms in the hydrocarbon is less than 8.

24. Process as in claim 17 in which said hydrocarbon content is principally saturated multicarbon hydrocarbon having at least 3 carbon atoms and the average number of carbon atoms in the hydrocarbon is less than 8.

25. Process as in claim 22 in which said hydrocarbon is principally saturated multicarbon hydrocarbon having at least 3 carbon atoms and the average number of carbon atoms in the hydrocarbon is less than 8.

26. Process as in claim 18 in which said chamber has a diameter which is more than 15 times the diameter of said orifice.

* * * * *

UNITED STATES PATENT OFFICE
CERTIFICATE OF CORRECTION

Patent No. 3,927,185           Dated December 16, 1975

Inventor(s) Morton Meadow et al.

It is certified that error appears in the above-identified patent and that said Letters Patent are hereby corrected as shown below:

Column 3, line 4, "Othe" should read -- other --.

Column 9, line 39, "steep" should read -- steel --.

Column 11, line 36, "4,288" should read -- 4.288 --

Column 11, line 38, "96;73" should read 96.73 --.

Column 14, line 11, "carbon atoms. atoms." should read

-- carbon atoms. --.

This certificate supersedes Certificate of Correction issued February 8, 1977.

Signed and Sealed this twelfth Day of July 1977

[SEAL]

Attest:

RUTH C. MASON  
Attesting Officer

C. MARSHALL DANN  
Commissioner of Patents and Trademarks